United States Patent
Lueders et al.

(10) Patent No.: US 7,044,256 B2
(45) Date of Patent: May 16, 2006

(54) DRIVE FOR A DEVICE FOR LIFTING A HOOD

(75) Inventors: Michael Lueders, Yokohama (JP); Karl Birk, Ebersbach (DE)

(73) Assignee: TRW Automotive GmbH, Alfdorf (DE)

( * ) Notice: Subject to any disclaimer, the term of this patent is extended or adjusted under 35 U.S.C. 154(b) by 86 days.

(21) Appl. No.: 10/783,197

(22) Filed: Feb. 20, 2004

(65) Prior Publication Data

US 2004/0206560 A1 Oct. 21, 2004

(30) Foreign Application Priority Data

Feb. 25, 2003 (DE) ................. 103 07 994

(51) Int. Cl.
*B60R 21/34* (2006.01)
(52) U.S. Cl. ................. 180/274; 180/69.21; 180/69.24; 180/69.2
(58) Field of Classification Search ............. 180/69.21, 180/274
See application file for complete search history.

(56) References Cited

U.S. PATENT DOCUMENTS 6,533,058 B1 * 3/2003 Peter ................ 180/274
6,860,356 B1 * 3/2005 Peter ................ 180/274

FOREIGN PATENT DOCUMENTS

| DE | 20105884 | 7/2001 |
|---|---|---|
| DE | 20106478 | 11/2001 |
| DE | 10034523 | 1/2002 |
| DE | 10117396 | 10/2002 |
| DE | 20217631 | 4/2003 |
| EP | 1179458 | 2/2002 |
| EP | 1258402 | 11/2002 |

* cited by examiner

*Primary Examiner*—Christopher P. Ellis
*Assistant Examiner*—Cynthia F. Collado
(74) *Attorney, Agent, or Firm*—Tarolli, Sundheim, Covell & Tummino L.L.P.

(57) ABSTRACT

A drive (10) for a device for raising a hood of a vehicle includes an energy storing unit which drives an actuating member (32) of a lifting mechanism coupled to the hood. The drive (10) further includes an electromotor (16) by which the accumulator can be set into a tensioned state, and a locking element which in a rest position holds the energy storing unit in the tensioned state. In addition, a carrier (26) is provided, movable in a linear manner by the electromotor (16) and capable of being coupled selectively to the energy storing unit. The carrier (26) by a first movement tensions the energy storing unit and by a second movement releases the locking element.

9 Claims, 2 Drawing Sheets

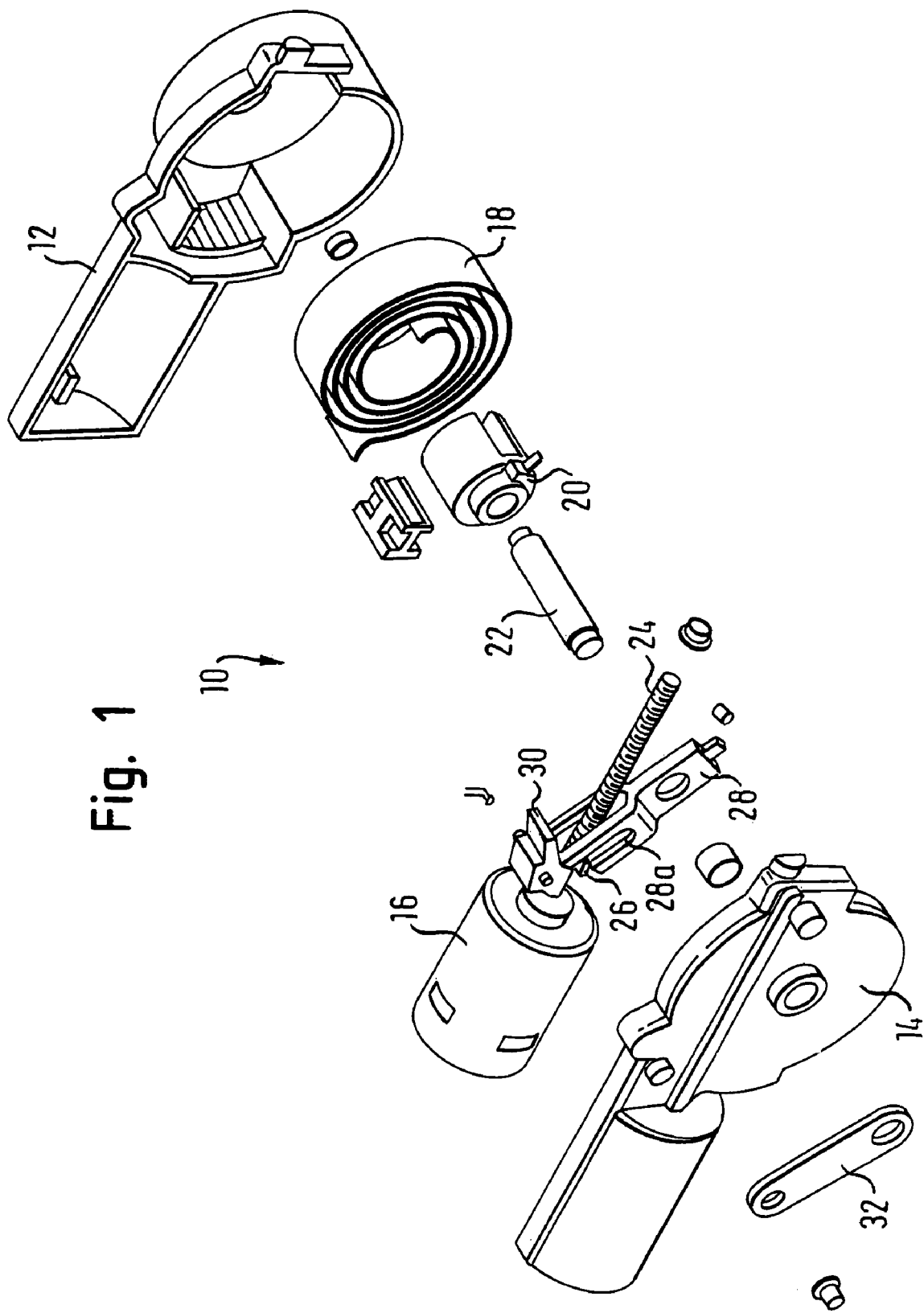

DRIVE FOR A DEVICE FOR LIFTING A HOOD

TECHNICAL FIELD

The invention relates to a drive for a device for lifting a hood of a vehicle.

BACKGROUND OF THE INVENTION

Conventional drives for devices for lifting a hood may comprise an energy storing unit, which drives an actuating member of a lifting mechanism coupled to the hood, an electromotor, by which the energy storing unit can be set into a tensioned state, and a locking element which in a rest position holds the energy storing unit in the tensioned state.

The protection of pedestrians in motor vehicles can be improved in that in a collision of a pedestrian with a motor vehicle, the hood is lifted in order to increase its distance from solid frame parts or engine parts. The kinetic energy of the pedestrian can be reduced by suitable deformation elements. Various drive designs are known for devices for lifting a hood. The essential requirements of such a drive are rapidity and reversibility. These requirements can be fulfilled at the most favourable cost with energy storing units which can be re-charged several times.

From published European patent application EP 1 179 458 A2 a reversible drive is known, in which a spiral spring can be tensioned by means of a reducing gear unit of an electromotor. If the reducing gear unit is brought into a release position by the motor, the hood moves abruptly into a lifted position by the released energy of the spiral spring.

It is an object of the invention to provide a drive which enables a rapid lifting of the hood, which can be transferred with minimum effort into its initial position again by the driver, and which is distinguished by a simple construction and a favourably priced installation.

BRIEF SUMMARY OF THE INVENTION

According to the invention, a drive for a device for raising a hood of a vehicle includes an energy storing unit which drives an actuating member of a lifting mechanism be coupled to the hood. The drive further includes an electromotor by which the accumulator can be set into a tensioned state, and a locking element which in a rest position holds the energy storing unit in the tensioned state. In addition, a carrier is provided, movable in a linear manner by the electromotor and capable of being coupled selectively to the energy storing unit. The carrier by a first movement tensions the energy storing unit and by a second movement releases the locking element. As both the tensioning of the energy storing unit and also the release are performed by means of the carrier which is able to be coupled selectively to the energy storing unit, a costly reducing gear unit for these purposes can be dispensed with.

The arrangement of the carrier on a threaded spindle coupled to the motor is particularly advantageous. The carrier can thus be moved forward and backward by particular distances on the spindle in a defined manner.

According to a preferred embodiment, the drive comprises a bearing shaft mounted, in a housing. The energy storing unit of this embodiment preferably comprises a spiral spring and a coupling element non-rotatably coupled to the bearing shaft, the spiral spring being fastened by one end to the housing and by the other end to the coupling element. The spiral spring can therefore be tensioned in a simple manner by a rotation of the bearing shaft.

In order to effectively convert the linear movement of the carrier, the carrier can be brought into engagement with a swivellable lever for tensioning of the energy storing unit, the lever being non-rotatably coupled to the bearing shaft. The linearly moved carrier therefore provides for a swivelling of the lever, which in turn tensions the spiral spring, due to its non-rotatably coupling with the bearing shaft and the coupling element.

In the preferred embodiment, the locking element is a locking pawl supported on the housing, the locking pawl in a detent position engaging and securing the lever. Locking pawls can be designed so that they can take over high forces. A simple actuation of the locking pawl into a release position is produced in that in its detent position the locking pawl rests on the carrier. By a simple movement of the carrier, the locking pawl can thus be released.

The actuating member is preferably a hinge member coupled non-rotatably to the bearing shaft, so that the rotation of the bearing shaft can be utilized directly for the lift of the hood.

BRIEF DESCRIPTION OF THE DRAWINGS

FIG. 1 shows an exploded view of a drive according to the invention; and

DETAILED DESCRIPTION OF A PREFERRED EMBODIMENT

Figure 2A:
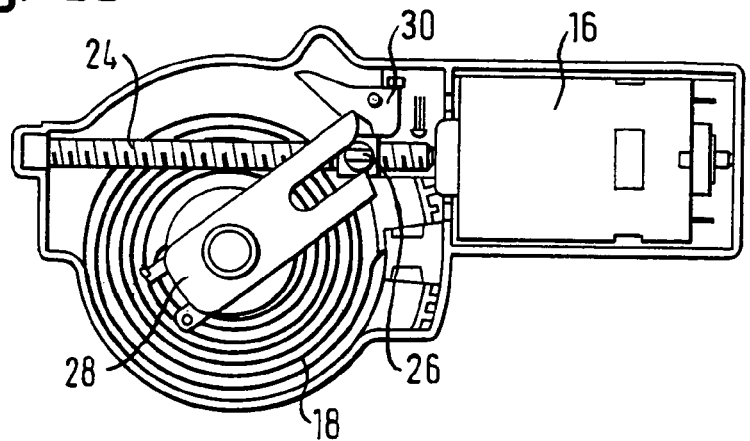
FIGS. 2a to 2c show views of the drive without cover in various operating states.

From FIG. 1, in which the individual components of a drive 10 for a device for lifting a hood of a vehicle are illustrated, the basic structure of the drive 10 can be seen, only the most important components of which are discussed in detail below. Arranged in a housing 12 with associated cover 14 are an electromotor 16 and an energy storing unit which comprises a spiral spring 18 and a coupling element 20. The radially outer end of the spiral spring 18 is securely fastened to the housing 12, the radially inner end is securely fastened to the coupling element 20, which in turn is arranged non-rotatably on a bearing shaft 22. A threaded spindle 24 is coupled to the motor 16, by means of which a carrier 26 can be displaced in a linear manner on the spindle 24. In addition, on the bearing shaft 22 a lever 28 is arranged non-rotatably, which can be swivelled by rotation of the bearing shaft 22. The free end of the lever 28 has two sections which extend on opposite sides of the spindle 24. Both sections have a recess 28a which is open on the end side, into which recess 28a the carrier 26 can engage. A locking element in the form of a locking pawl 30 mounted on the housing 12 can be swivelled between a rest position (see FIG. 2a), in which it engages the lever 28, and a release position (see FIGS. 2b and 2c), in which it releases the lever 28. An actuating member, arranged outside the cover 14 and constructed as a swivellable hinge part 32, which is coupled non-rotatably to the energy storing unit by means of the bearing shaft 22, represents the connection member to a hinge mechanism which is not illustrated in further detail, by means of which the hood of the vehicle can be lifted.

In FIG. 2a, the drive 10 is illustrated in its initial position with the energy storing unit being tensioned. The spiral spring 18 is pre-tensioned so that its radially inner end tends to rotate in an anticlockwise direction (in accordance with the illustration of FIG. 2a). Such a rotation, however, is prevented by the locking pawl 30, situated in the rest position, which secures the lever 28 which is coupled non-rotatably to the energy storing unit. Here, the locking pawl 30 rests on the carrier 26, which is situated in a position close to the motor 16.

Figure 2B:
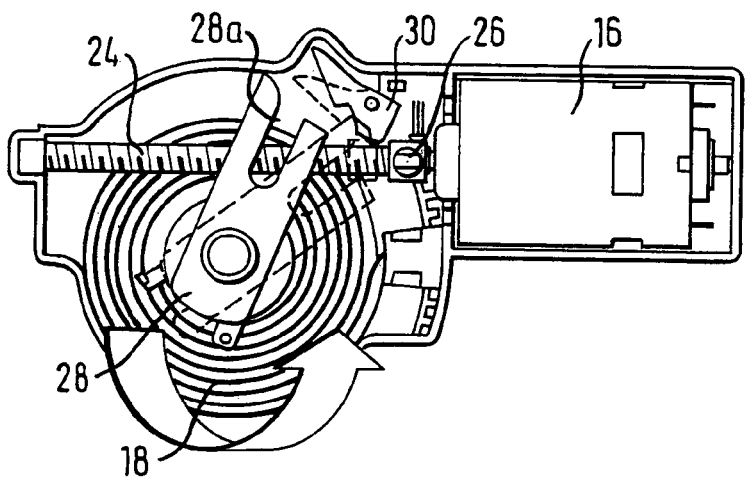

To activate the drive 10, the motor 16 is triggered so that by rotation of the spindle 24 in a first direction of rotation it moves the carrier 26, arranged on the spindle 24, still closer towards the motor 16, as shown in FIG. 2b. This movement of the carrier 26 frees the locking pawl 30 and the lever 28, so that the pre-tensioned energy storing unit is no longer held. Accordingly, the lever 28 moves abruptly in an anti-clockwise direction. The rotary movement which is transferred to the hinge part 32, is utilized for actuating the hinge mechanism for lifting the engine hood.

Figure 2C:
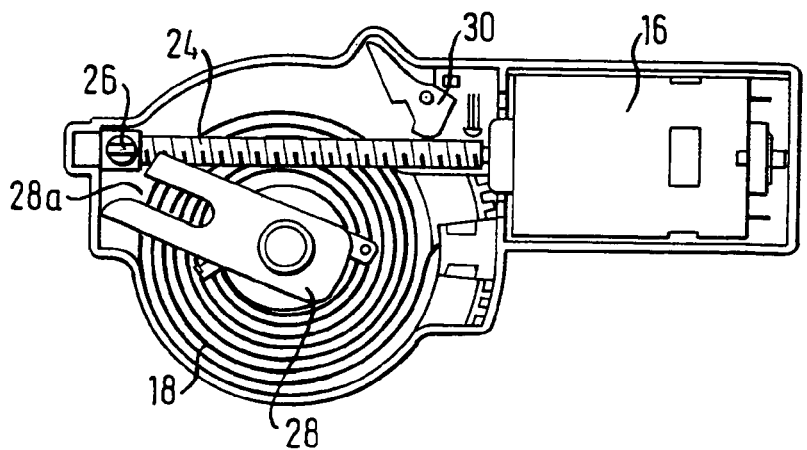

For a further use of the drive 10, the energy storing unit must be tensioned again. For this, the motor 16 is operated with an opposite direction of rotation, so that the carrier 26 on the spindle 24 is moved away from the motor 16, until it has reached the position shown in FIG. 2c. Shortly before reaching this position, the lever 28, which after the setting-up process has assumed the final position shown in FIG. 2c, is pressed downwards in a load-free manner by the carrier 26. After the passing of the carrier 26, the lever 28 springs back again into the position shown in FIG. 2c.

Thereafter, the rotary movement of the motor is reversed again, i.e. the carrier 26 moves again towards the motor 16. Here, it engages into the recesses 28a, so that the lever 28 is swivelled back by the movement of the carrier 26 and thereby tensions the spiral spring 18. As soon as the carrier 26 and the lever 28 have arrived in their initial position, the locking pawl 30 engages again (see FIG. 2a). After the tensioning, the locking pawl 30 takes over the holding force of the energy storing unit and therefore relieves the spindle 24. The drive 10 is now ready for a further application.

The invention claimed is:

1. A drive (10) for a device for raising a hood of a motor vehicle, comprising an energy storing unit, which drives an actuating member of a lifting mechanism coupled to the hood, an electromotor (16), by which the energy storing unit can be set into a tensioned state, and a locking element which in a rest position holds the energy storing unit in the tensioned state, characterized in that a carrier (26) is provided, moveable in a linear manner by the electromotor (16) and capable of being coupled selectively to the energy storing unit, the carrier by a first linear movement tensioning the energy storing unit and by a second linear movement releasing the locking element.

2. A drive (10) for a device for raising a hood of a motor vehicle, comprising an energy storing unit, which drives an actuating member of a lifting mechanism coupled to the hood, an electromotor (16), by which the energy storing unit can be set into a tensioned state, and a locking element which in a rest position holds the energy storing unit in the tensioned state, characterized in that a carrier (26) is provided, moveable in a linear manner by the electromotor (16) and capable of being coupled selectively to the energy storing unit, the carrier by a first movement tensioning the energy storing unit and by a second movement releasing the locking element, characterized in that the carrier (26) is arranged on a threaded spindle (24) coupled to the motor (16).

3. The drive according to claim 1, characterized in that the drive (10) comprises a bearing shaft (22) mounted in a housing (12).

4. The drive according to claim 3, characterized in that the energy storing unit comprises a spiral spring (18) and a coupling element (20) coupled non rotatably to the bearing shaft (22), the spiral spring (18) being fastened by one end to the housing (12) and by the other end to the coupling element (20).

5. The drive according to claim 3, characterized in that for tensioning the energy storing unit, the carrier (26) can be brought into engagement with a swivellable lever (28), which is coupled non-rotatably to the bearing shaft (22).

6. The drive according to claim 5, characterized in that the locking element is a locking pawl (30) supported on the housing (12), the locking pawl in a rest position engaging and securing the lever (28).

7. The drive according to claim 6, characterized in that the locking pawl (30) in the rest position rests on the carrier (26).

8. The drive according to claim 1, characterized in that the actuating member is a hinge member (32) coupled non-rotatably to the bearing shaft (22).

9. The drive according to claim 4 wherein said one end of said spiral spring (18) that is fastened to said housing (12) is located radially inward with respect to the rotational axis of the spiral spring (18) from said other end of said spiral spring (18) that is fastened to the coupling element (20).

* * * * *